May 29, 1923.
H. A. TOULMIN, JR
SHOCK ABSORBER
Filed April 7, 1921
1,456,657
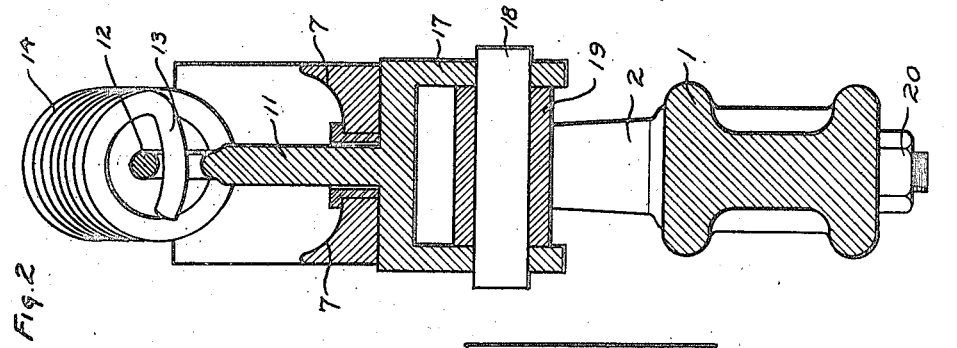
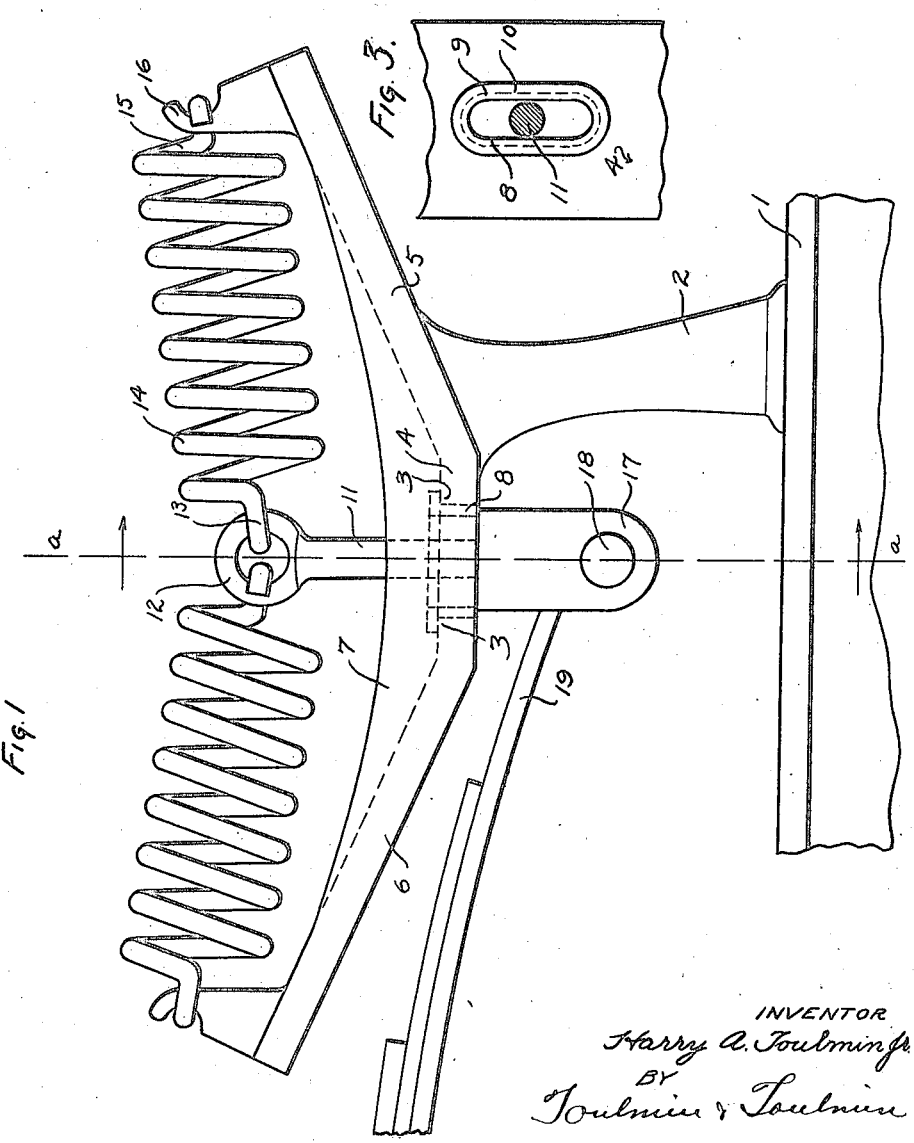
INVENTOR
Harry A. Toulmin Jr.
BY
Toulmin & Toulmin
ATTORNEYS Patented May 29, 1923.

1,456,657

UNITED STATES PATENT OFFICE.

HARRY A. TOULMIN, JR., OF DAYTON, OHIO, ASSIGNOR TO THE TEMCO ELECTRIC MOTOR COMPANY, OF LEIPSIC, OHIO, A CORPORATION OF OHIO.

SHOCK ABSORBER.

Application filed April 7, 1921. Serial No. 459,446.

*To all whom it may concern:*

Be it known that I, HARRY A. TOULMIN, Jr., a citizen of the United States, residing at Dayton, in the county of Montgomery and State of Ohio, have invented certain new and useful Improvements in Shock Absorbers, of which the following is a specification, reference being had therein to the accompanying drawing.

My invention relates to shock absorbers for vehicles.

The object of my invention is to provide a shock absorber which will not only absorb the shocks but will also absorb the rebound action of the normal spring equipment in the construction of automobiles and similar automotive equipment. It is my object to combine in one shock absorber, so called, the functions of absorbing the shock and of absorbing the rebound. It is my object to provide absorbing mediums of different rates of vibration and of different mechanical characteristics so that the shocks will not only be absorbed but also dampened and their characteristics so changed that they will be prevented from being injurious to the vehicle and to the passengers when finally transmitted in their diminished form to them.

My invention is an improvement upon the Thompson Patent No. 1,072,791, and employs the principle of construction and method of operation disclosed in that patent in which the shock is caused to pass from the road wheel through the axle to a shock absorbing medium of one rate of vibration and of one characteristic of vibration, and having thus been changed in its characteristics is delivered to another spring medium of a different ratio of vibration and of different characteristics, whereby the shock is again modified and changed so that when it is finally delivered to the vehicle it has been so dampened and absorbed and broken up into its component parts that the result in vibration is not serious to the vehicle or its occupants. It is my object to provide a means of absorbing shock by the transmission of that shock from the road wheel to the axle and thence into a quickly vibrating medium to break up the shock by readily distributing it into a number of minor sharp pulsations and then to communicate these minor sharp pulsations to a slow moving spring element into which each of these short sharp vibrations will be passed and converted into slow moving lengthened vibrations thus eliminating any sharp shock of great volume. It has been found that if the shock is transmitted through a highly responsive quick moving resilient element, such as a helical spring, that such an element will be of sufficient responsiveness to break up the shock but not to absorb it entirely and the absorption can then take place by the slow moving leaf spring. It has also been found, and it is my object to obviate this by my construction, that if the shock is transmitted first to a leaf spring that because of its slow moving characteristics the shock will be transmitted therethrough in the same way that the shock would be transmitted through a substantially solid body, because the leaf spring, due to its slow moving characteristics, is unable to quickly absorb the shock and for practical purposes it is substantially a solid medium.

It is my object to employ this principle of operation disclosed in the Thompson patent referred to above and put it into a novel form of construction wherein I employ means of absorbing the rebound and absorbing the shock. It is another object of my invention to provide shock absorbers which may be applied in limited locations where the area is restricted for the application of a shock absorber. It is also my object to provide a shock absorber which can be placed either lengthwise of the axle or transversely of it. It is also my object to provide a shock absorber which can be placed readily upon an existing automotive vehicle by removing the existing parts and inserting in their precise location a similar part which is a portion of my shock absorber.

It is my object to provide a shock absorber, so-called, which permits the vehicle to substantially float upon the yielding spring elements and to depend upon these elements for the absorption of the large proportion of minor shocks to a road vehicle without transmitting those shocks at all to the heavier and slow moving leaf springs. It is my object to provide a shock absorber and rebound reducer with elements out of synchronism with each other.

Referring to the drawings:

Fig. 1, is a side elevation of a shock absorber mounted parallel with the axle in a position when the car is under load;

Fig. 2, is an end elevation of this shock absorber which is in section along the line

*a—a* and is viewed in the direction of the arrow in Figure 1;

Fig. 3, is a plan view of the guide way for the stem of the type of absorber shown in Figures 1 and 2.

It will be understood that there will be an absorber placed on each corner of the vehicle. The particular adaptation shown here is the application of an absorber to a Ford car. The Ford car transverse leaf spring is shown. The Ford car stanchion has been removed, as well as the Ford car shackle and a new stanchion inserted of the same dimensions with a projected head, as will be described, for carrying the new mechanism.

1 is an axle upon which is mounted a stanchion 2 that has on one side of it a limiting stop 3. Upon this stanchion is a supporting frame 4 with arms 5 and 6, and a strengthening rib 7 is placed on either side of the frame joining the arms to one another. In this frame is cut an aperture 8 that is bordered by a bushing 9 that has a shoulder 10 to maintain it in position. This bushing is loosely fitted into the aperture 8 in the frame 4 so that no machine work is necessary. The steel pin 11 travels in this aperture 8 having on its upper end an eye 12. Through the eye are inserted the ends 13 of the springs 14. These springs are also hooked at 15 to a hook 16 mounted on the end of the frame at either end. This facilitates an easy method of assembling the several parts, but any method of connection may be used.

At the lower end of the pin is an eye 17 through which passes a spring bolt 18 to connect the leaf spring 19 thereto. The stanchion 2 is held in position on the axle 1 by the nut 20.

The absorber in Figure 1 is shown in position of normal load. When unloaded the springs stand substantially in a horizontal plane. When a shock comes upon them they will be put under tension and will move downwardly at their inner ends and be extended upon the rebound when they will be moved upwardly at their inner ends and extended. They have the constant tendency to maintain themselves upon a horizontal line drawn between the two points of connection with the respective hooks 16.

While I have shown and described certain features as constituting my invention, it will be understood that parts have been shown for purposes of illustration only, and that I do not desire to be limited to such details, as obvious modifications will occur to a person skilled in the art.

Having thus fully described my invention, what I claim as new and desire to secure by Letters Patent, is:—

1. In combination, a stanchion having opposed ends, a resilient element connected to either end of said stanchion, a supporting link connected at one end to said resilient element and at the other end to a second resilient element, the parts being so arranged that the shock imparted to the vehicle will pass through the stanchion, the resilient element, the supporting link to the second resilient element in the order named.

2. In combination, a stanchion having opposed ends, a resilient element connected at either end to said stanchion, a supporting link connected at one end to said resilient element and at the other end to a second resilient element, and guiding and limiting means for the supporting link, the parts being so arranged that the shock will be imparted to the stanchion, the first resilient element, the supporting link, and the second resilient element in the order named, whereby the movement of the supporting link will be limited.

3. In combination, a stanchion mounted upon an axle, a pair of resilient elements having the outer ends attached to said stanchion, and their inner ends connected to a supporting link, a supporting link, a leaf spring parallel with said axle supporting a body, whereby shocks may be absorbed and the rebound prevented in an automotive vehicle.

4. In combination, an axle, a stanchion mounted thereon, a helical spring having one end connected to said stanchion, and the other end connected to the end of a supporting link, a second helical spring having one end connected to said stanchion opposite to the first mentioned helical spring and its other end connected to the same link, a supporting link passing through said stanchion adapted to be guided by it, a leaf spring parallel with the axle and below said stanchion connected to the lower end of said link, whereby shocks may be absorbed and the rebound prevented in an automotive vehicle.

5. In combination in a shock absorber, means to support resilient elements, a pair of resilient elements of a given rate of vibration having two of their ends connected and the other of their ends supported by said supporting means, a second resilient element of a different rate of vibration adapted to vibrate out of synchronism with the first elements, and connecting means connecting said resilient elements to one another, the parts being so arranged in such an order that the shock imparted to the support must pass through the first resilient elements first and thence through the second resilient element.

6. In combination, in a vehicle of a shock absorber, composed of a Y-shaped stanchion mounted upon an axle, a helical spring pivotally mounted at the outer end of one arm of the Y and loosely connected to the eye of a pin at its other end, a second helical spring so connected to the other end of the other arm of the Y and connected to the eye of the pin, a supporting pin passing through said stanchion below said helical springs, a leaf spring pivotally connected to the end of said supporting pin, whereby the shock will be first dampened in the resilient means of a high rate of vibration and then dampened in the second resilient means with a slow rate of vibration.

7. In combination, in a vehicle of a shock absorber, composed of a Y-shaped stanchion mounted upon an axle, a helical spring pivotally mounted at the outer end of one arm of the Y and loosely connected to the eye of a pin at its other end, a second helical spring so connected to the other end of the other arm of the Y and connected to the eye of the pin, a supporting pin passing through said stanchion below said helical springs, a leaf spring pivotally connected to the end of said supporting pin, the aperture in said stanchion adapted to guide the pin in one direction and limit its movement in the other direction, whereby the shock will be first dampened in the resilient means of a high rate of vibration and then dampened in the second resilient means with a slow rate of vibration.

In testimony whereof, I affix my signature.

HARRY A. TOULMIN, Jr.